(12) United States Patent
Goud et al.

(10) Patent No.: US 7,483,974 B2
(45) Date of Patent: Jan. 27, 2009

(54) VIRTUAL MANAGEMENT CONTROLLER TO COORDINATE PROCESSING BLADE MANAGEMENT IN A BLADE SERVER ENVIRONMENT

(75) Inventors: Gundrala D. Goud, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 881 days.

(21) Appl. No.: 10/671,180

(22) Filed: Sep. 24, 2003

(65) Prior Publication Data
US 2005/0076107 A1 Apr. 7, 2005

(51) Int. Cl.
G06F 11/00 (2006.01)
G06F 15/173 (2006.01)
(52) U.S. Cl. ............... 709/224; 709/223; 714/28
(58) Field of Classification Search .......... 709/223, 709/224; 714/28, 30; 718/1
See application file for complete search history.

(56) References Cited

U.S. PATENT DOCUMENTS

| | | | |
|---|---|---|---|
| 6,772,099 B2* | 8/2004 | Merkin et al. | 702/188 |
| 6,931,475 B2* | 8/2005 | Huang et al. | 710/316 |
| 2002/0016868 A1* | 2/2002 | Peacock | 709/321 |
| 2003/0131136 A1* | 7/2003 | Emerson et al. | 709/250 |
| 2003/0152074 A1* | 8/2003 | Hawkins et al. | 370/389 |
| 2003/0188222 A1* | 10/2003 | Abbondanzio et al. | 714/12 |
| 2004/0024831 A1* | 2/2004 | Yang et al. | 709/208 |
| 2004/0030944 A1* | 2/2004 | Barr et al. | 713/400 |
| 2004/0268157 A1* | 12/2004 | Dake et al. | 713/300 |
| 2007/0168481 A1* | 7/2007 | Lambert et al. | 709/223 |

OTHER PUBLICATIONS

IPMI Intelligent Platform Management Communications Protocol Specification v1.0. Nov. 15, 1999.*

* cited by examiner

*Primary Examiner*—Glenton B Burgess
*Assistant Examiner*—Philip J Chea
(74) *Attorney, Agent, or Firm*—Blakely, Sokoloff, Taylor & Zafman LLP

(57) ABSTRACT

A method and apparatus to implement a virtual management controller to coordinate processing blade management in a blade server environment. A management mode of operation of a processing blade of a blade server is activated. During the management mode of operation, a chassis management module is interacted with to manage operation of the processing blade. Thereafter, the management mode of operation of the processing blade is deactivated.

24 Claims, 8 Drawing Sheets

VIRTUAL MANAGEMENT CONTROLLER TO COORDINATE PROCESSING BLADE MANAGEMENT IN A BLADE SERVER ENVIRONMENT

TECHNICAL FIELD

This disclosure relates generally to processing blade management in a blade server environment, and in particular but not exclusively, relates to emulating a management controller of a processing blade with a software proxy layer.

BACKGROUND INFORMATION

Blade server architecture is an evolving technology that conveniently packages a server on a single board called a processing blade and houses a plurality of similar processing blades in a chassis. The processing blades can be easily installed or removed as desired and share common resources, such as input/output ("I/O" ports), a compact disc read only memory ("CD-ROM") drive, a floppy drive, a digital versatile disc ("DVD") drive, one or more network connections, etc. The ease with which the processing power can be scaled by adding or removing processing blades is a key feature driving the development and use of blade server technology. This scalable feature makes blade servers ideal candidates for performing tasks such as data and webpage hosting.

Processing blades typically are complete processing systems including one or more processors, firmware, system memory, one or more hard disks, one or more network interface cards ("NICs"), and the like. Known processing blades also generally include a baseboard management controller ("BMC") and an associated BMC firmware unit. A BMC is usually a coprocessor or service processor, separate from the one or more main processors. The BMC communicates with a chassis management module ("CMM"), typically mounted on the chassis of the blade server, to coordinate and to manage operation of the individual processing blade.

In general, a blade server will house a plurality of processing blades, each having its own BMC and BMC firmware unit, which all coordinate with the CMM. The inclusion of the BMC and the BMC firmware unit in each processing blade substantially increases build of material ("BOM") costs. In addition, the BMCs and the BMC firmware units consume valuable real estate on the surface of the processing blades. These two adverse consequences of the BMCs and the BMC firmware units directly conflict with two key goals associated with the development and implementation of blade server technology—providing a high density and economical processing solution.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for coordinating management of processing blades with a chassis management module of a blade server using software proxy layers are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
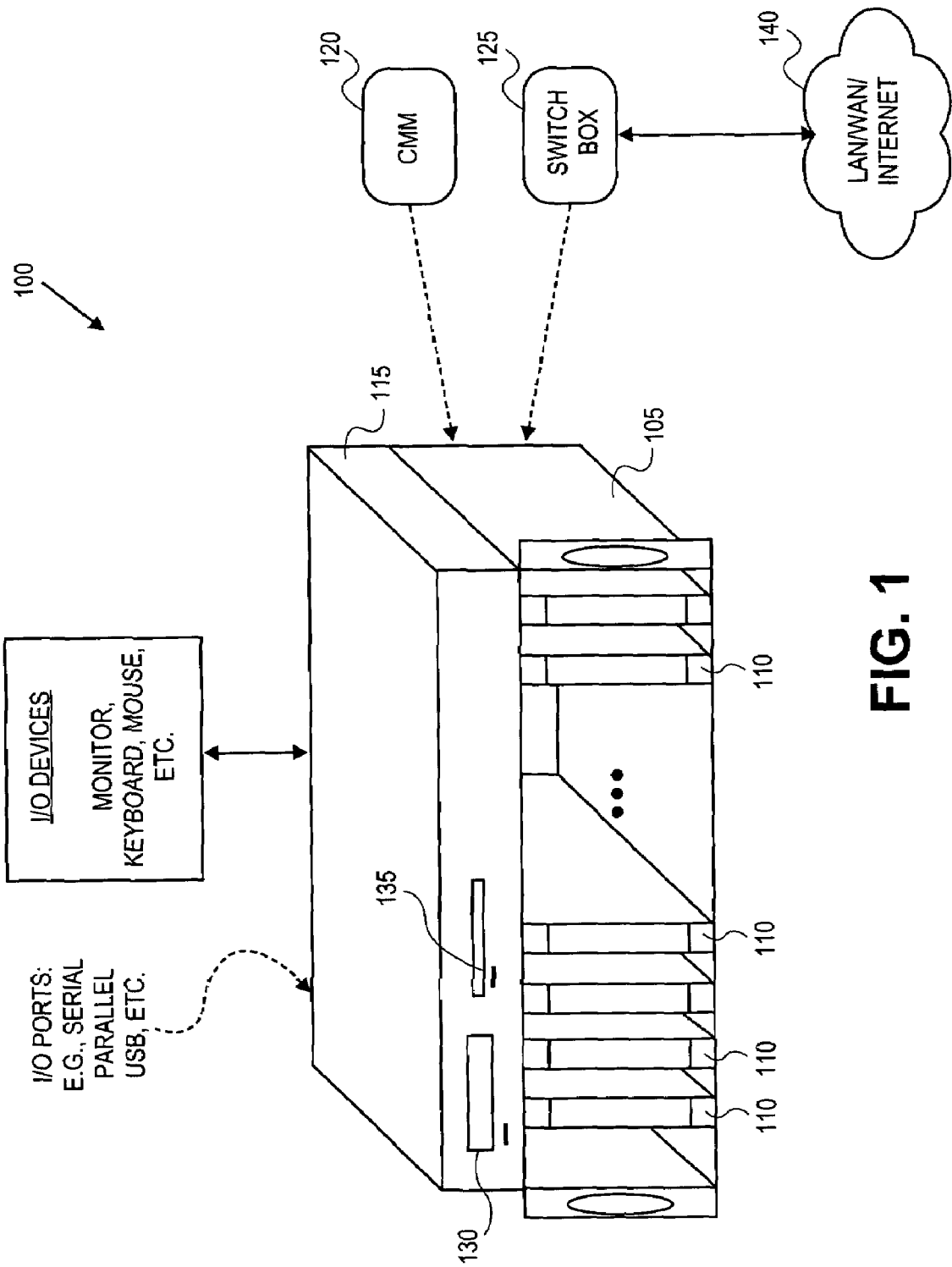
FIG. 1 is a perspective view of a blade server including a plurality of processing blades.

FIG. 1 is a perspective view of a blade server 100 including a chassis 105, processing blades 110, and a media tray 115. Chassis 105 includes a chassis management module ("CMM") 120 and a switch box 125. Media tray 115 optionally rests on top of chassis 105 and provides processing blades 110 with shared resources such as I/O ports (e.g., serial port, parallel port, universal serial bus port), I/O devices (e.g., monitor, keyboard, mouse), a CD-ROM drive 130, a floppy drive 135, and the like. Switch box 125 provides processing blades 110 with switchable access to a network 140 (e.g., local area network, wide area network, Internet). Typically, CMM 120 is an independent hardware module with dedicated firmware to perform management functions, such as for example, coordinating arbitration and allocation of shared resources between processing blades 110, logging system errors, coordinating fault resilient booting of processing blades 110, fan control, power supply monitoring and regulation, and the like.

Figure 2:
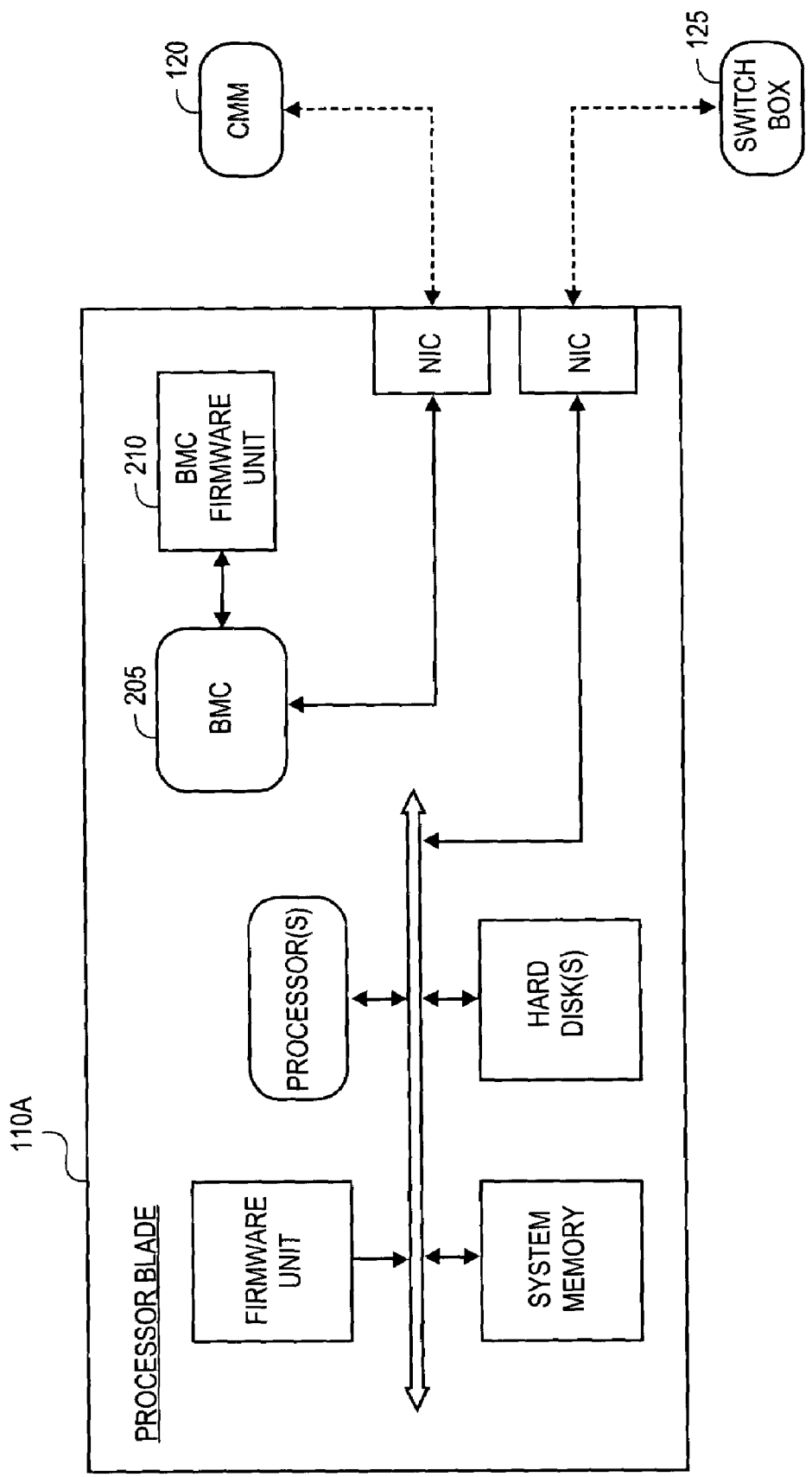
FIG. 2 is a block diagram illustrating a known processing blade, including a baseboard management controller.

FIG. 2 is a block diagram illustrating a known processing blade 110A, which may be installed into chassis 105. Processing blade 110A is a complete processing system including its own processor(s), firmware (e.g., basic input output system), system memory, hard disk(s), and network interface cards ("NICs"). Processing blade 110A is capable of booting and executing an operating system ("OS") over network 140. Processing blade 110A further includes a baseboard management controller ("BMC") 205 and associated BMC firmware unit 210. BMC 205 includes a service processor, which coordinates with CMM 120 to perform the management functions described above. For example, BMC firmware unit 210 contains firmware instructions executed by BMC 205 for processing blade 110A to request access to the shared resources provided by media tray 115. Communication between BMC 205 and CMM 120 occurs across a backplane (not shown) of chassis 105 where communication may occur out-of-band of communication across network 140. Similarly, each of the processing blades 110 can gain access to the shared resources provided by media tray 115 via the backplane of chassis 105.

Figure 3:
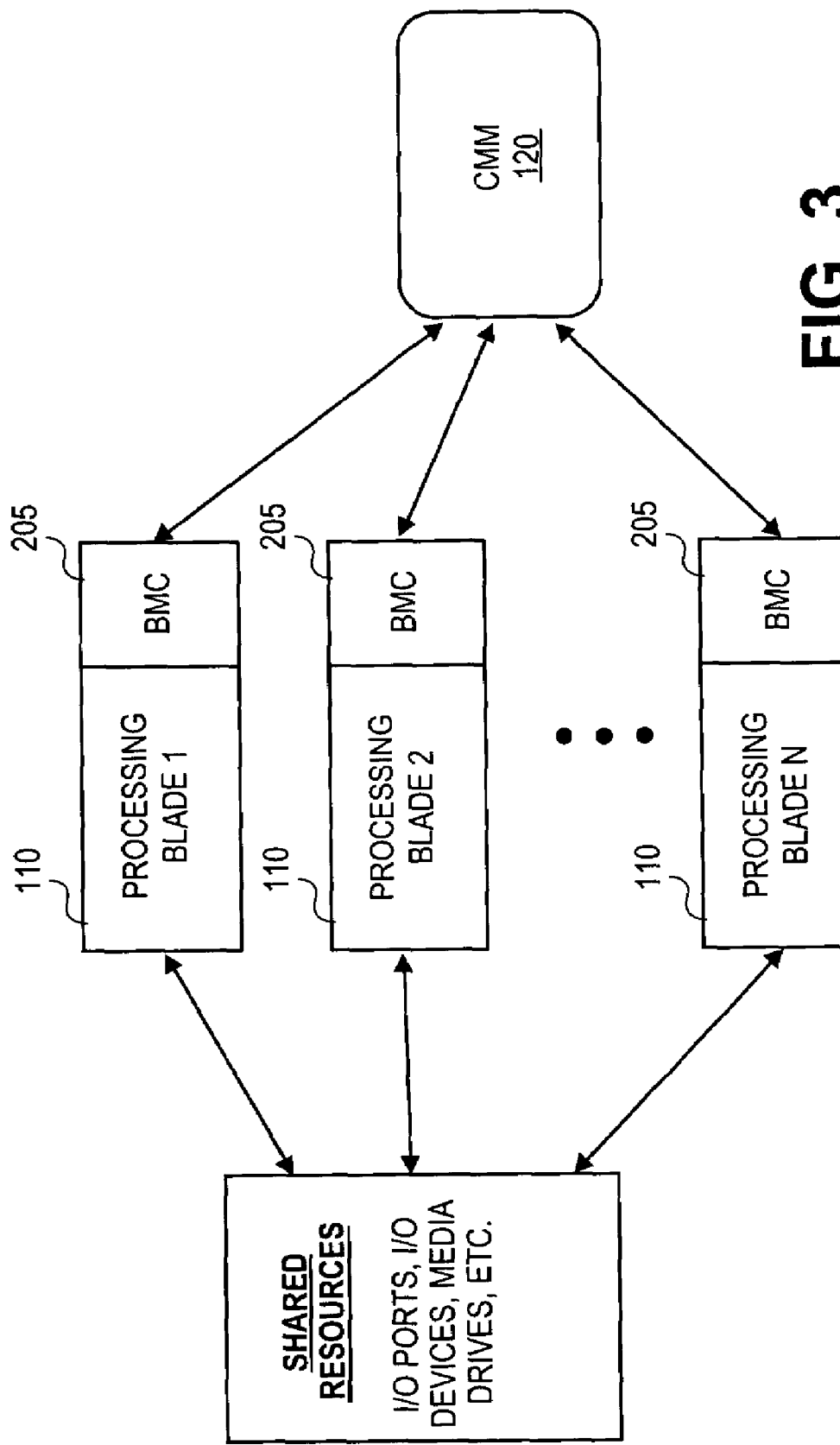
FIG. 3 is a block diagram illustrating how baseboard management controllers of known processing blades communicate with a chassis management module to coordinate access to shared resources.

FIG. 3 is a block diagram illustrating how each of processing blades 110 includes its own BMC 205 to communicate with CMM 120 to manage and to coordinate processing blades 110. BMCs 205 are responsible for requesting permission from CMM 120 to access the shared resources. For example, CMM 120 arbitrates and allocates access to the shared resources of blade server 100 to ensure data collisions arising from bus contentions are avoided. To facilitate management of all processing blades 110, each processing blade 110 includes a BMC 205 to communication with CMM 120 via the backplane.

Figure 4:
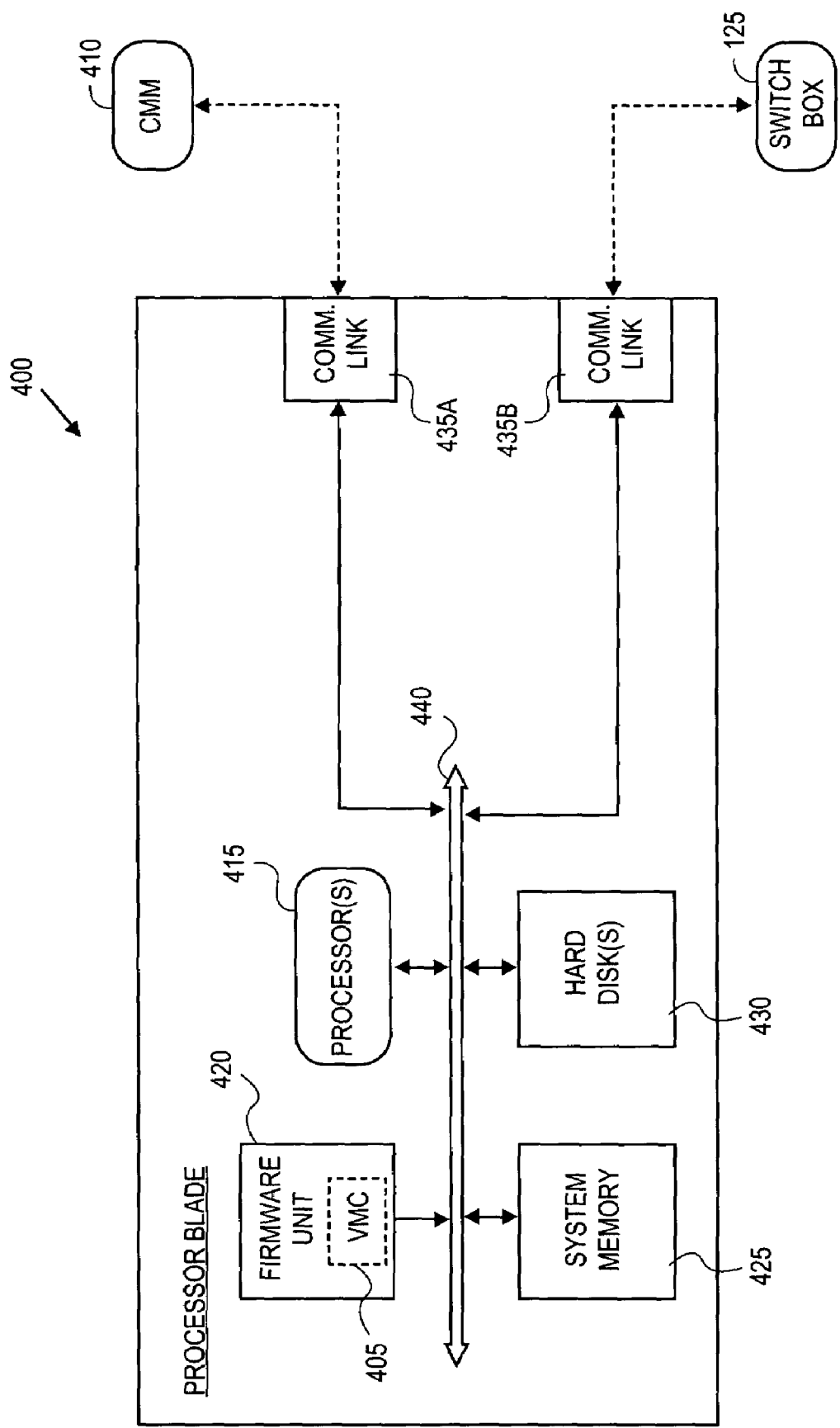
FIG. 4 is block diagram illustrating a processing blade for executing a virtual management controller to facilitate communication with a chassis management module, in accordance with an embodiment of the present invention.

FIG. 4 is a block diagram illustrating a processing blade 400 for executing a virtual management controller ("VMC") 405 to facilitate communication with a chassis management module ("CMM") 410, in accordance with an embodiment of the present invention. The illustrated embodiment of processing blade 400 includes one or more processor(s) 415, a firmware unit 420, system memory 425, one or more hard disk(s) 430, communication links 435A and 435B, and a system bus 440.

The elements of processing blade 400 are interconnected as follows. Processor(s) 415 are communicatively coupled to firmware unit 420, system memory 425, hard disk(s) 430, and communication links 435A and 435B via system bus 440 to send and to receive instructions thereto/therefrom. In one embodiment, firmware unit 420 is a flash memory device. In other embodiments, firmware unit 420 includes any one of read only memory ("ROM"), programmable ROM, erasable programmable ROM, electrically erasable programmable ROM, or the like. In one embodiment, system memory 425 includes random access memory ("RAM"). In one embodiment, communication links 435A and 435B include network interface cards ("NICs"). Hard disk(s) 430 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

It should be appreciated that various other elements of processing blade 400 have been excluded from FIG. 4 and this discussion for the purposes of clarity. Furthermore, the illustrated embodiment of processing blade 400 is only one possible embodiment of a processing blade accordingly to the teachings of the present invention. One of ordinary skill in the art having the benefit of the present disclosure will understand various modifications to the architecture of processing blade 400 may be implemented within the scope of the present invention. For example, processing blade 400 may include only one communication link, instead of the two illustrated, or may include three or more to increase bandwidth capabilities of processing blade 400.

In one embodiment, firmware unit 420 stores a software entity or VMC 405 for communicating with CMM 410. VMC 405 acts as a software proxy layer to implement the functionality of a hardware BMC, such as BMC 205. Typically, VMC 405 is executed by one of processor(s) 415 to coordinate management functions of processing blade 400 with CMM 410 or to request access to shared resources, such as those provided by media tray 115. In one embodiment, VMC 405 is stored in firmware unit 420 and copied to system memory 425 to be executed therefrom by the selected one of processor(s) 415 during a management mode of operation of processing blade 400. In one embodiment, the management mode of operation is transparent to an operating system ("OS") runtime of processing blade 400.

Figure 5:
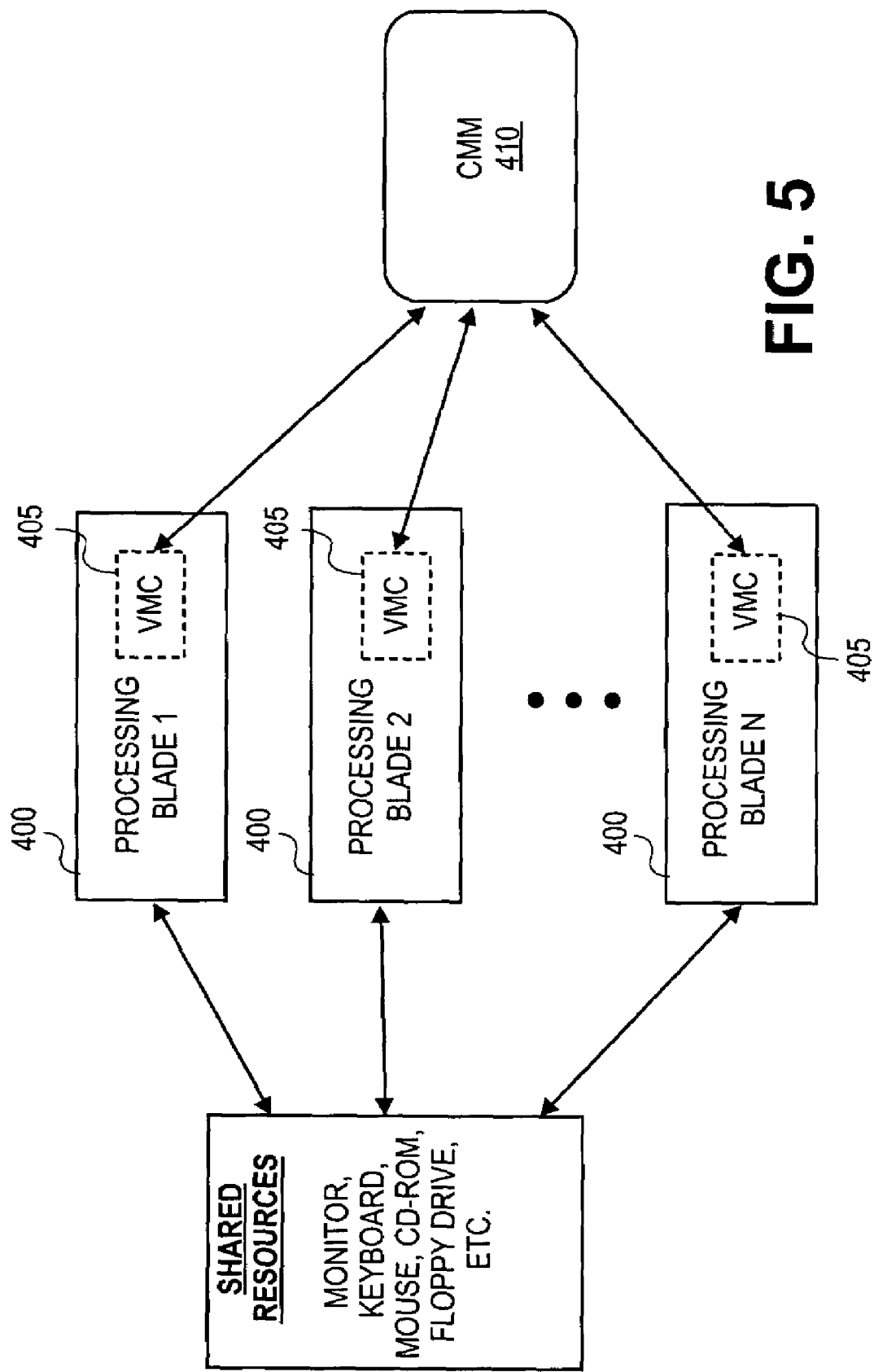
FIG. 5 is a block diagram illustrating how virtual management controllers executing on processing blades communicate with a chassis management module of a blade server to coordinate access to shared resources, in accordance with an embodiment of the present invention.

FIG. 5 is a block diagram illustrating how a plurality of VMCs 405 executing on a plurality of processing blades 400 communicate with CMM 410 via a backplane of a blade server chassis. Each VMC 405 is responsible to communicating with CMM 410 to coordinate management functions of the corresponding processing blade 400 and to gain access to the shared resources for its processing blade 400. Thus, embodiments of the present invention reduce the build of material ("BOM") costs of each processing blade 400 by eliminating the need for a hardware service processor and associated BMC firmware unit. Furthermore, processing blades 400 can be designed more compactly due to the surface area savings associated with elimination of a hardware service processor. Accordingly, embodiments of the present invention enable blade servers having a higher density of processing blades. Alternatively, the surface area saved by eliminating a hardware service processor could be occupied by an additional processor 415 or communication link 435, thereby increase processing power/bandwidth of processing blades 400.

Figure 6:
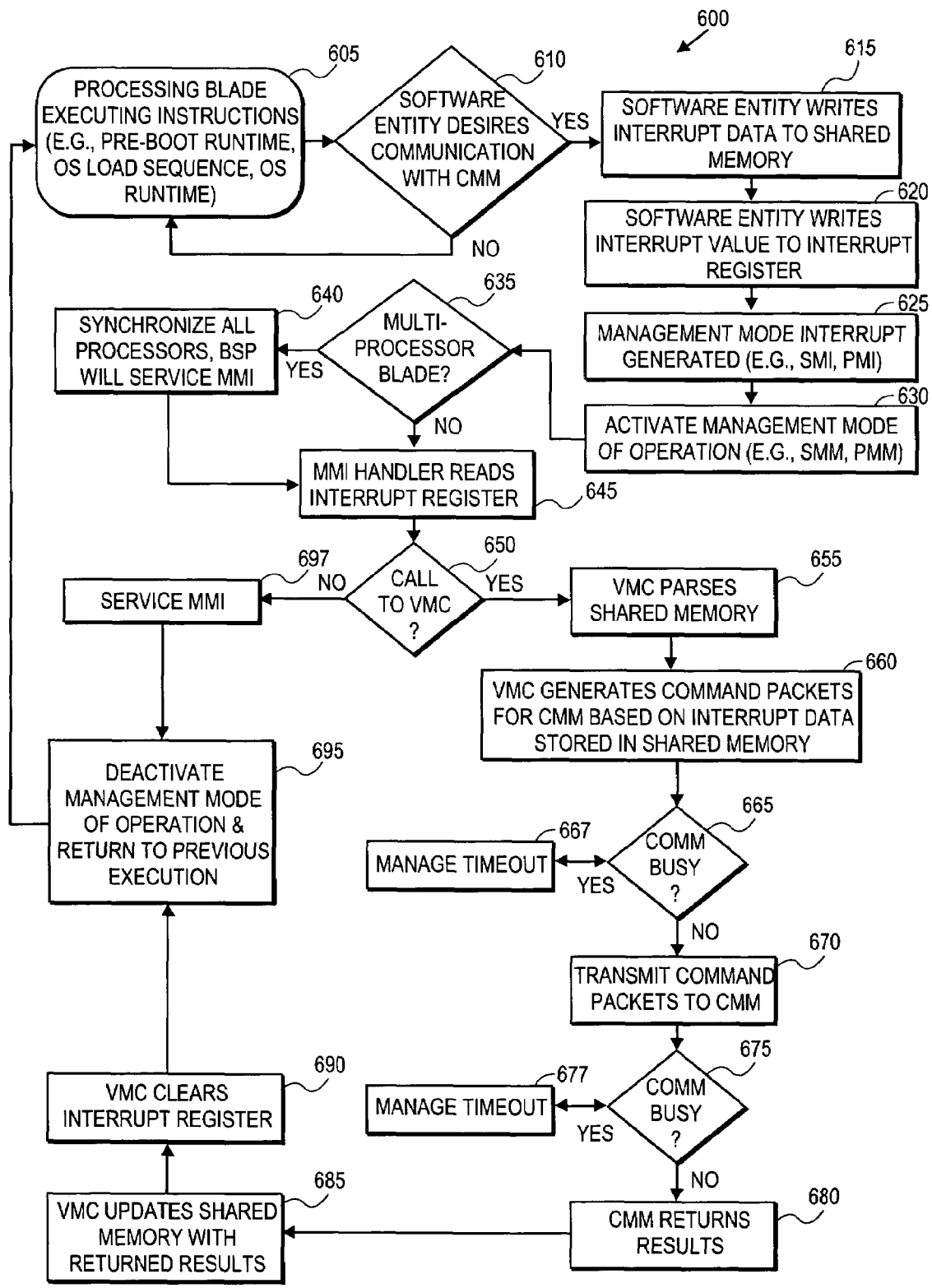
FIG. 6 is a flow chart illustrating a process for implementing the functionality of a baseboard management controller with a software proxy layer called a virtual management controller, in accordance with an embodiment of the present invention.

FIG. 6 is a flow chart illustrating a process 600 for implementing the functionality of a BMC using VMC 405, in accordance with an embodiment of the present invention. In a process block 605, processing blade 400 is executing instructions during any one of a pre-boot runtime, an OS load sequence, and an OS runtime. In a decision block 610, a software entity executing on processing blade 400 determines that communication with CMM 410 is necessary to accomplish a desired task. The task may include requesting access to the shared resources (e.g., media tray 115, network 140 via switch box 125), reporting a system error (e.g., one or more of processor(s) 415 is hung/faulting, system memory 425 is corrupted, hard disk(s) 430 are corrupted or faulty, etc.) to CMM 410, coordinating with CMM 410 to perform fault resilient booting, event forwarding, and other tasks traditionally requiring the aid of BMC 205.

Figure 7:
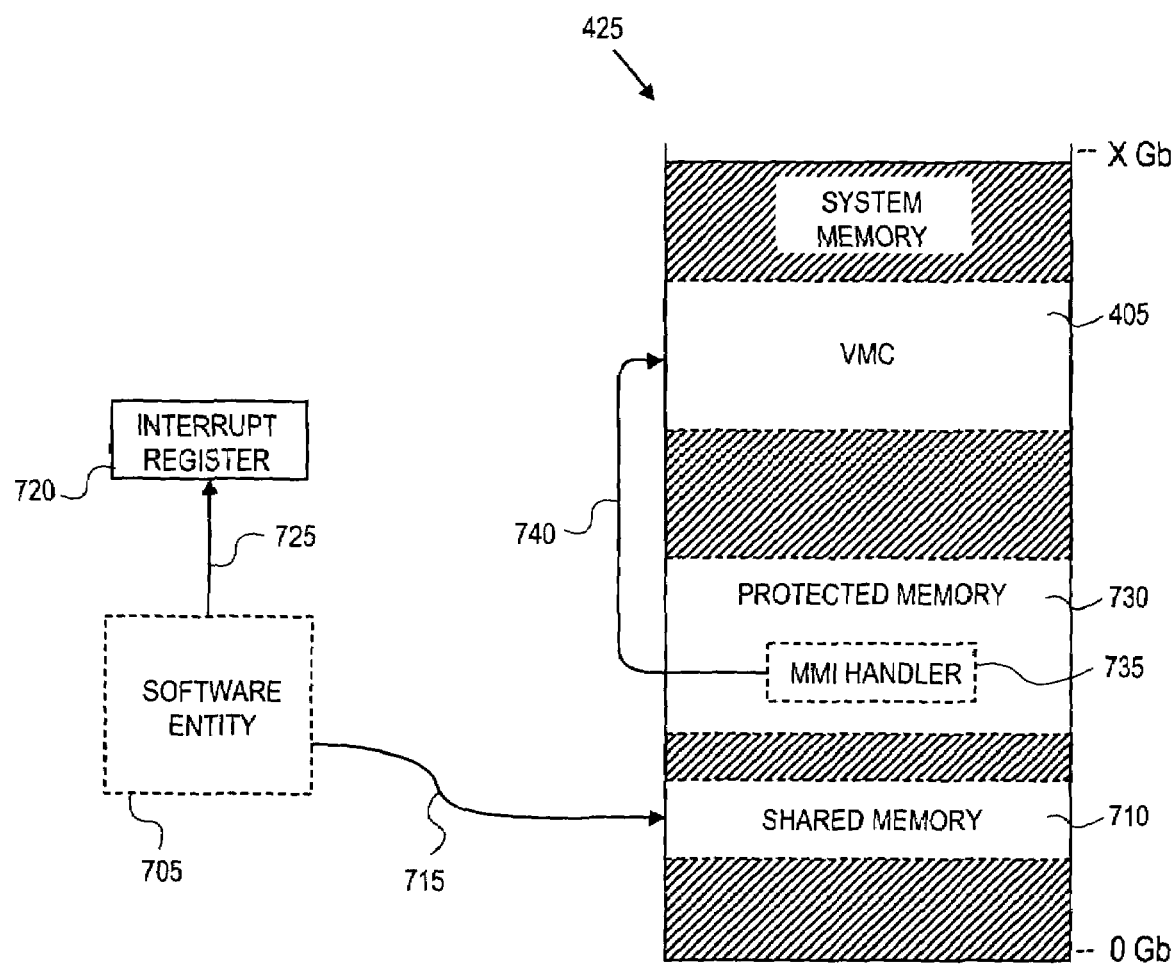
FIG. 7 is a block diagram illustrating linked software agents for implementing a virtual management controller, in accordance with an embodiment of the present invention.

Referring to FIG. 7, a software entity 705 determines that communication with CMM 410 is necessary to accomplish the desired task. FIG. 7 is a block diagram illustrating linked software agents for implementing VMC 405 on processing blade 400, in accordance with an embodiment of the present invention. Software entity 705 represents any software entity executed by one of processor(s) 415. For example, software entity 705 may be a pre-boot device driver, an extensible firmware interface ("EFI") application, an OS driver, an OS application, or the like.

Returning to FIG. 6 and FIG. 7, in a process block 615, software entity 705 writes interrupt data to shared memory 710, as indicated by arrow 715. Shared memory 710 is a portion of system memory 425 which was allocated early in a boot-up process of processing blade 400 for storing the interrupt data. In one embodiment, the interrupt data written to shared memory 710 is data which indicates the desired task that software entity 705 wishes to accomplish.

In a process block 620, software entity 705 writes an interrupt value to an interrupt register 720, as indicated by arrow 725. In a process block 625, a synchronous management mode interrupt ("MMI") is generated in response to software entity 705 writing the interrupt value to interrupt register 720. The MMI is synchronous because it was initiated by a software entity, rather than an asynchronous hardware entity. It should be appreciated that embodiments of the present invention may include hardware entities generating an asynchronous MMI.

In a process block 630, processor(s) 415 activate a management mode of operation in response to the MMI. The management mode of operation is an execution mode of processor(s) 415 that is transparent to one or more of the pre-boot runtime, the OS load sequence, and the OS runtime of processor(s) 415. Typically, the management mode of operation is transparent to all of the above. Activating the management mode of operation causes one of processor(s) 415 to jump to protected memory 730 and commence execution from a determined location therein. In one embodiment, protected memory 730 is a portion of system memory 425 that was allocated early in the boot-up process of processing blade 400 to establish a secure and stable execution environment for the management mode of operation.

In one embodiment where processor(s) 415 are 32-bit Intel Architecture ("IA-32") processors, the management mode of operation is a system management mode ("SMM"). SMM is specified by an *IA-32 Intel Architecture Software Developer's Manual, Volume* 3: *System Programming Guide* (2003) made available by Intel® Corporation. Since the 386SL processor was introduced by the Intel® Corporation, SMM has been available on 32-bit Intel Architecture ("IA-32") processors as an operation mode hidden to operating systems that executes code loaded by firmware. SMM is a special-purpose operating mode provided for handling system-wide functions like power management, system hardware control, or proprietary original equipment manufacturer ("OEM") designed code. The mode is deemed transparent or "hidden" because pre-boot applications, the OS, and OS runtime software applications cannot see it, or even access it. In this SMM embodiment, the MMI is referred to as a system management interrupt ("SMI") and protected memory 730 is referred to as system management random access memory ("SMRAM"). Only applications executed during SMM have access to SMRAM. When an event generates an SMI (e.g., software entity 705 writing the interrupt value to interrupt register 720), processor(s) 415 respond by saving a substantial part of their current state in a state save map, initialize some registers to provide the SMM execution environment, and then begin execution inside SMM.

In one embodiment where processor(s) 415 are members of the Itanium® Processor Family ("IPF"), the management mode of operation is a platform management mode ("PMM"). PMM is roughly analogous to SMM and is activated upon processor(s) 415 receiving a MMI referred to as a platform management interrupt ("PMI").

Returning to FIG. 6, in a decision block 635 it is determine whether processing blade 400 includes more than one processor 415. If processing blade 400 includes multiple processor(s) 415, the processors are allocated to one of two groups—application processors ("APs") and a boot-strap processor ("BSP"). Although processing blade 400 may include several AP processors, only one of processor(s) 415 is a BSP at any given time. The current BSP is responsible for servicing the MMI. If processing blade 400 includes multiple processors 415, then process 600 continues to a process block 640.

In a process block 640, all of processors 415 are synchronized and the one of processors 415 currently designated as the BSP takes control and services the MMI as described below. Subsequently, process 600 continues to a process block 645. If processing blade 400 includes only a single processor 415, process 600 proceeds directly to process block 645 from decision block 635, without need to synchronize multiple processors 415.

As briefly mentioned above, upon activation of the management mode of operation (e.g., SMM, PMM, or the like) the BSP processor branches into protected memory 730 and executes an MMI handler 735. In process block 645, MMI handler 735 reads the interrupt value written to interrupt register 720 by software entity 705. As mentioned above, the interrupt value provides MMI handler 735 with information to determine why the management mode of operation was activated and to which address location within system memory 425 to branch to service the MMI. In one embodiment, MMI handler 735 includes a case statement correlating interrupt values to branch addresses.

In a decision block 650, MMI handler 735 determines whether the MMI was activated to invoke VMC 405, based on the interrupt value read from interrupt register 720. If the interrupt value corresponds to VMC 405, indicating that software entity 705 desires to invoke VMC 405 to interact with CMM 410, then the BSP processor branches to VMC 405, as indicated by an arrow 740, and process 600 continues to a process block 655.

In a process block 655, VMC 405 parses shared memory 710 to determine what task software entity 705 desires to accomplish and thereby determine its appropriate course of action. For example, if software entity 705 desires access to CD-ROM drive 130 of media tray 115, VMC 405 will parse the interrupt data written to shared memory 710 by software entity 705 to determine that software entity 705 desires access to CD-ROM drive 130. Once this is determined, VMC 405 can communicate with CMM 410 to arbitrate for access to CD-ROM drive 130.

In a process block 660, VMC 405 generates one or more command packets to transmit to CMM 410 based on the parsed interrupt data. The command packet(s) contain the requisite requests/information to enable software entity 705 to accomplish the desired task. In a decision block 665, VMC 405 waits until CMM 410 is available. If CMM 410 is currently busy performing other management tasks, VMC 405 manages the timeout in a process block 667. Managing a timeout may include simply waiting a predetermine period of time and then checking to see if CMM 405 is available or other known techniques for managing timeouts.

Once CMM 410 is available for communication with VMC 405, VMC 405 transmits the command packet(s) to CMM 410, in a process block 670. In a decision block 675 and a process block 677, VMC 405 waits for a response from CMM 410 and manages any timeouts that may occur, as described above. In a process block 680, CMM 410 returns results to VMC 405 in response to the command packet(s) transmitted in process block 670. The returned results may simply indicate that software entity 705 has been granted access to the requested shared resource, may indicate that software entity 705 has been denied access to the requested shared resources, may include an error code or may be other instructions, commands, or information from CMM 410 relating to any one of the management tasks performed by CMM 410.

In a process block 685, VMC 405 updates shared memory 710 with the results returned from CMM 410. Updating shared memory 710 may include copying the results into a designated portion of shared memory 710, overwriting the interrupt data written into shared memory 710 by software entity 705, parsing the results and storing the parsed results to shared memory 710 in a predetermined and meaningful manner or any other sensible manner.

In a process block 690, VMC 405 clears interrupt register 720 or returns it to a default value. Although process 600 illustrates process block 690 occurring subsequently to VMC 405 updating shared memory 710, it should be appreciated that other embodiments of the present invention may include clearing interrupt register 720 prior to or concurrently with updating shared memory 710.

Once shared memory 710 has been updated and interrupt register 720 cleared, process 600 continues to a process block 695. In process block 695, VMC 405 branches back to MMI handler 735. If no other cases statements are satisfied within MMI handler 735 (i.e., MMI handler 735 determines there are no other tasks to execute during the instant management mode of operation), MMI handler 735 deactivates the management mode of operation and returns processor(s) 415 to their previous execution prior to activating the management mode of operation (return to process block 605). Thus, software entity 205 and other applications/drivers executing during the pre-boot runtime, the OS load sequence, or the OS runtime are unaware that the management mode of operation was activated and deactivated. In this manner, the management mode of operation is transparent to these operation modes.

Figure 8:
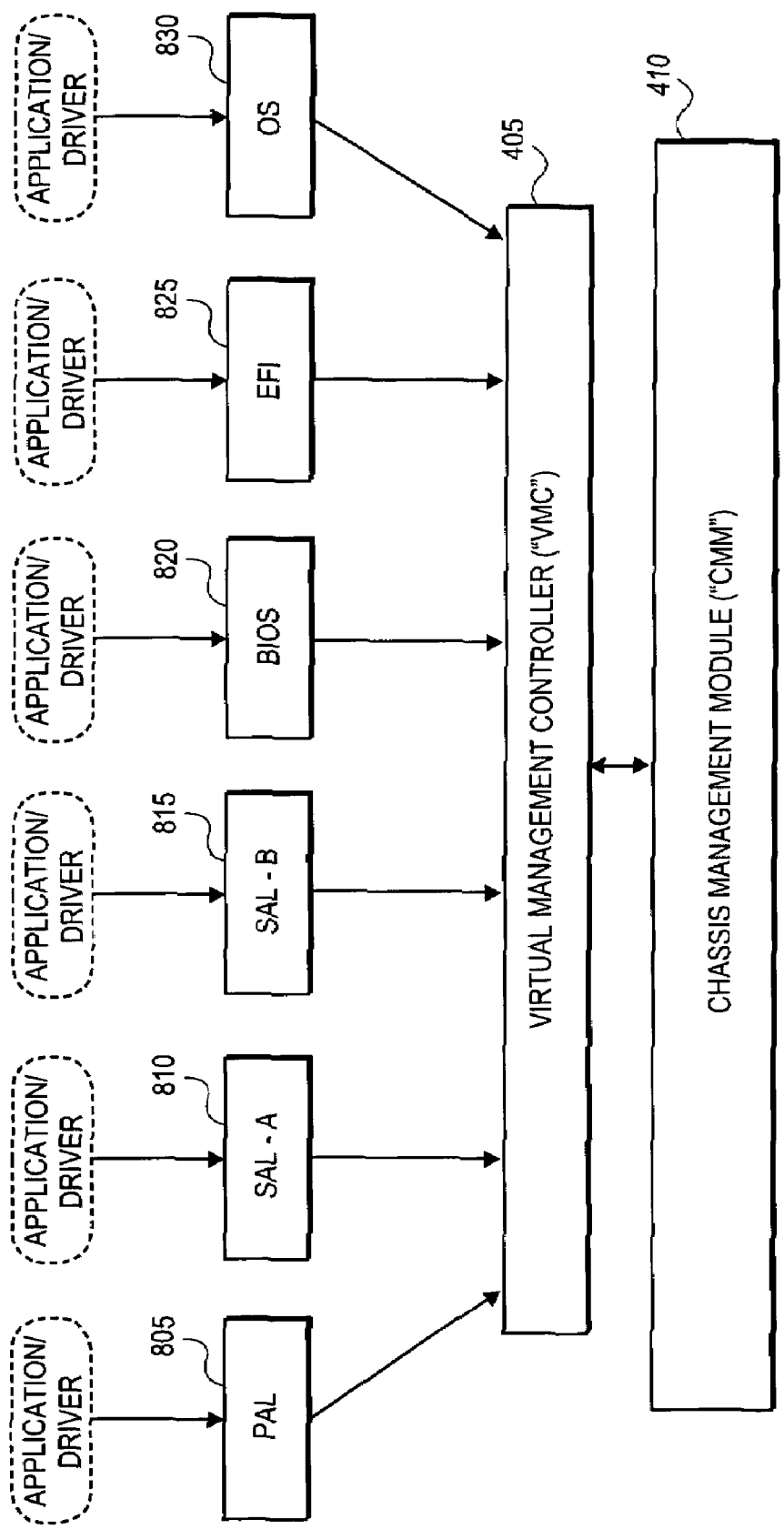
FIG. 8 is a block diagram illustrating how applications/drivers executing in various different operating environments can communicate with a virtual management controller to communicate with a chassis management module of a blade server, in accordance with an embodiment of the present invention.

FIG. 8 is block diagram illustrating how applications/drivers executing in various different operating environment can communicate with VMC 405 to in turn communicate with CMM 410, in accordance with an embodiment of the present invention. For example, applications and/or drivers executing in each of the following environments: processor abstraction layer ("PAL") 805, system abstraction layer—A ("SAL-A") 810, a system abstraction layer—B ("SAL-B"), BIOS 820, extensible firmware interface ("EFI") 825, and an OS 830 can interact with VMC 405 by writing interrupt data to shared memory 710 and setting interrupt register 720 appropriately. In comparison, prior art methods required each environment to include independent software protocols to talk with BMC 205. Thus, embodiments of the present invention simplify the management and operation of processing blades within a blade server environment by eliminating the need to write redundant BMC protocols for each operating environment of processor(s) 415.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

In one embodiment, a machine-accessible medium provides instructions that, if executed by a machine, cause the machine to perform operations comprising activating a management mode of operation of a processing blade of a blade server, using a software proxy layer in a firmware unit to emulate a baseboard management controller and to interact with a chassis management module ("CMM") of the blade server during the management mode of operation to manage operation of the processing blade wherein the firmware unit having the software proxy layer is included in the processing blade, and deactivating the management mode of operation using a management mode interrupt handler.

What is claimed is:

1. A method, comprising:
    activating a management mode of operation of a processor on a processing blade, the processing blade included within a blade server;
    using a software proxy layer in a firmware unit to emulate a baseboard management controller and to interact with a management module of the blade server during the management mode of operation to manage operation of the processing blade, wherein the firmware unit having the software proxy layer is included in the processing blade; and
    deactivating the management mode of operation of the processor using a management mode interrupt handler,
    wherein the management mode of operation of the processor is transparent to a pre-boot runtime of the processor and to an operating system runtime of the processor, and wherein:
        activating the management mode of operation comprises saving state information of the processor and saving an execution location of the processor prior to entering the management mode of operation, and
        deactivating the management mode of operation comprises exiting the management mode of operation, loading the saved state information into the processor, and returning the processor to the saved execution location.

2. The method of claim 1 wherein the management mode of operation of the processor is further transparent to an operating system load sequence.

3. The method of claim 1 wherein activating the management mode of operation of the processor comprises activating the management mode of operation in response to a software entity executed by the processing blade.

4. The method of claim 1 wherein the management mode of operation comprises one of a system management mode ("SMM") and a platform management mode ("PMM").

5. The method of claim 1, further comprising:
    activating a plurality of management modes of operation of a corresponding plurality of processing blades of the blade server in response to a corresponding plurality of software entities executing on each of the processing blades;
    interacting with the management module of the blade server during each of the plurality of management modes of operation to manage operation of each of the plurality of processing blades; and
    deactivating the plurality of management modes of operation.

6. The method of claim 5 wherein:
    activating the plurality of management modes of operation comprises activating each one of the plurality of management modes of operation of each of the plurality of processing blades at an independent time, and
    deactivating the plurality of management modes of operation comprises deactivating each one of the plurality of management modes of each of the plurality of processing blades at an independent time.

7. The method of claim 1 wherein interacting with the management module includes at least one of coordinating with the management module for access to shared resources of the blade server, reporting system errors to the management module, and coordinating fault resilient booting with the management module.

8. The method claim 7 wherein the shared resources include at least one of a floppy drive, a compact disc read only memory ("CD-ROM") drive, a DVD-ROM drive, a serial port, a parallel port, a universal serial bus port, a monitor, a keyboard, and a mouse.

9. A machine-accessible medium that provides instructions that, if executed by a machine, will cause the machine to perform operations comprising:
 activating a management mode of operation of a processing blade of a blade server;
 using a software proxy layer in a firmware unit to emulate a baseboard management controller and to interact with a chassis management module ("CMM") of the blade server during the management mode of operation to manage operation of the processing blade wherein the firmware unit having the software proxy layer is included in the processing blade; and
 deactivating the management mode of operation using a management mode interrupt handler,
 wherein the management mode of operation of the processing blade is transparent to a pre-boot runtime of the processing blade and to an operating system runtime of the processing blade, and
 wherein:
  activating the management mode of operation comprises saving state information of a processor of the processing blade and saving an execution location of the processor prior to entering the management mode of operation, and
  deactivating the management mode of operation comprises exiting the management mode of operation, loading the saved state information into the processor, and returning the processor to the saved execution location.

10. The machine-accessible medium of claim 9, further providing instructions that, if executed by the machine, will cause the machine to perform the operations wherein the management mode of operation of the processing blade is further transparent to an operating system load sequence.

11. The machine-accessible medium of claim 9, further providing instructions that, if executed by the machine, will cause the machine to perform the operations wherein:
 activating the management mode of operation of the processing blade comprises activating the management mode of operation in response to a software entity stored in or on the firmware unit executing on the processing blade.

12. The machine-accessible medium of claim 9, further providing instructions that, if executed by the machine, will cause the machine to perform the operations wherein the management mode of operation comprises one of a system management mode ("SMM") and a platform management mode ("PMM").

13. The machine-accessible medium of claim 9, further providing instructions that, if executed by the machine, will cause the machine to perform operations comprising:
 activating a plurality of management modes of operation of a corresponding plurality of processing blades of the blade server in response to a corresponding plurality of software entities stored in or on a corresponding plurality of firmware units executing on each of the processing blades;
 interacting with the CMM of the blade server during each of the plurality of management modes of operation to manage operation of each of the plurality of processing blades; and
 deactivating the plurality of management modes of operation.

14. The machine-accessible medium of claim 9, further providing instructions that, if executed by the machine, will cause the machine to perform the operations wherein:
 interacting with the CMM includes at least one of coordinating with the CMM for access to shared resources of the blade server, reporting system errors to the CMM, and coordinating fault resilient booting with the CMM.

15. A processing blade,
 a processor to execute instructions;
 a communication link communicatively coupled to the processor, the communication link to communicatively couple to a chassis management module ("CMM") of a blade server; and
 a firmware unit having a software proxy layer communicatively coupled to the processor, the software proxy layer to emulate a baseboard management controller and to communicate with the CMM during a management mode of operation of the processor to coordinate operation of the processing blade with the CMM;
 wherein the management mode of operation of the processor is transparent to a pre-boot runtime of the processor and to an operating system runtime of the processor, and
 wherein:
  activating the management mode of operation comprises saving state information of the processor and saving an execution location of the processor prior to entering the management mode of operation, and
  deactivating the management mode of operation comprises exiting the management mode of operation, loading the saved state information into the processor, and returning the processor to the saved execution location.

16. The processing blade of claim 15 wherein the firmware unit is to perform at least one of coordinating with the CMM for access to shared resources of the blade server, reporting system errors to the CMM, and coordinating fault resilient booting with the CMM.

17. The processing blade of claim 16 wherein the shared resources include at least one of a floppy drive, a compact disc read only memory ("CD-ROM") drive, a DVD-ROM drive, a serial port, a parallel port, a universal serial bus port, a monitor, a keyboard, and a mouse.

18. The processing blade of claim 16 wherein the firmware unit to be invoked by a software entity executing on the processing blade, the software entity to invoke the firmware unit to request access to at least one of the shared resources of the blade server.

19. The processing blade of claim 15 wherein the management mode of operation comprises one of a system management mode ("SMM") and a platform management mode ("PMM").

20. A blade server, comprising:
 a chassis having a chassis management module ("CMM"); and
 a plurality of processing blades supported within the chassis, each of the plurality of processing blades communicatively coupled to the CMM, each of the plurality of processing blades comprising:
  a processor to execute instructions;

a communication link communicatively coupled to the processor, the communication link communicatively coupled to the CMM; and a flash memory unit communicatively coupled to the processor and having stored therein a firmware unit having a software proxy layer, the software proxy layer to emulate a baseboard management controller and to communicate with the CMM during a management mode of operation of the processor to coordinate operation of each of the plurality of processing blades with the CMM;

wherein the management mode of operation of the processor is transparent to a pre-boot runtime of the processor and to an operating system runtime of the processor, and wherein:

activating the management mode of operation comprises saving state information of the processor and saving an execution location of the processor prior to entering the management mode of operation, and deactivating the management mode of operation comprises exiting the management mode of operation, loading the saved state information into the processor, and returning the processor to the saved execution location.

21. The blade server of claim 20 wherein the firmware unit of each of the plurality of processing blades is to perform at least one of coordinating with the CMM for access to shared resources of the blade server, reporting system errors to the CMM, and coordinating fault resilient booting with the CMM.

22. The blade server of claim 21 wherein the processor of each of the plurality of processing blades activates the management mode of operation to execute the firmware unit in response to a software entity, the software entity to trigger activation of the management mode of operation to request access to at least one of the shared resources.

23. The blade server of claim 22 wherein the shared resources include at least one of a floppy drive, a compact disc read only memory ("CD-ROM") drive, a DVD-ROM drive, a serial port, a parallel port, a universal serial bus port, a monitor, a keyboard, and a mouse.

24. The blade server of claim 20 wherein the management mode of operation comprises one of a system management mode ("SMM") and a platform management mode ("PMM").

* * * * *

UNITED STATES PATENT AND TRADEMARK OFFICE
CERTIFICATE OF CORRECTION

PATENT NO. : 7,483,974 B2 Page 1 of 1
APPLICATION NO. : 10/671180
DATED : January 27, 2009
INVENTOR(S) : Goud et al.

It is certified that error appears in the above-identified patent and that said Letters Patent is hereby corrected as shown below:

In column 10, at line 17 after, -- blade, -- insert -- comprising --.

Signed and Sealed this

Twenty-seventh Day of July, 2010

David J. Kappos
*Director of the United States Patent and Trademark Office*